United States Patent Office 3,364,141
Patented Jan. 16, 1968

3,364,141
NOVEL METHOD FOR TREATING INDUSTRIAL PROCESSING WATER
Herman Berenson, Trenton, N.J., Albert Carl Dornbush, Pearl River, N.Y., and Donald Clifford Wehner, Fairfield, Conn., assignors to American Cyanamid Company, Stamford, Conn., a corporation of Maine
No Drawing. Original application Aug. 23, 1965, Ser. No. 481,941. Divided and this application July 27, 1967, Ser. No. 656,334
3 Claims. (Cl. 210—64)

ABSTRACT OF THE DISCLOSURE

The invention is directed to a method for treating industrial processing water to control the growth of microbial, algae or fungi organisms therein comprising: adding to said processing water a growth inhibiting amount of a compound of the formula:

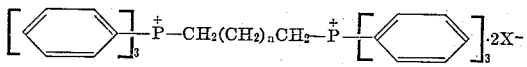

wherein X represents an anion and where $n$ is an integer of from 6 to 14.

---

The instant application is a divisional of copending application, Ser. No. 481,941, filed on Aug. 23, 1965.

The instant invention relates to novel antimicrobial, fungicidal and algicidal compositions and to methods for their use. More particularly, it relates to such biocidal compositions containing as the active component thereof an $\alpha,\omega$-alkylenebis[triphenylphosphonium salt] and to methods for controlling the growth of such diverse organisms as bacteria, fungi and algae.

Many antimicrobial, fungicidal and algicidal compositions are presently known. However, few such compositions exhibit broad spectrum activity for demanding use under an ever widening variety of conditions. For instance, many algicides for use in treatment of tower cooling waters as well as pool waters are not effective over a protracted time period due to the presence of oxidants, such as chlorine, which cause their ready degradation. In swimming pools and in industrial waters used in cooling towers for air conditioning, algae are a considerable problem. They produce mats of slime which restrict the flow of water through heat exchangers, serve as food for bacteria, cause slippery, hazardous conditions in pools and are unsightly. Chlorine is normally added to swimming pools in amounts ranging from about 0.1 to about 0.5 part per million and often to cooling waters for bacterial control but many algae species are chlorine resistant to the low levels of chlorine used. Higher levels of chlorine are not useable because of eye and mucous membrane irritation in pools and corrosion inducing properties in cooling water systems. Where higher levels of chlorine are used, known algicides are generally degraded and destroyed.

Biocidal compositions to be useful should be effective against an encountered organism which is to be controlled. In this connection, the compositions should be (a) safe to handle and (b) stable under those conditions prevailing at the point of contact or application. It is, therefore, a principal object of the invention to provide such compositions and to provide methods for their use.

In accordance with the present invention, it has been surprisingly found that compositions containing as an active ingredient thereof the compound of the general formula:

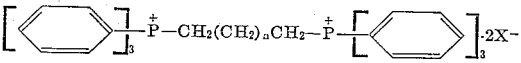

wherein $n$ is an integer from 6 to 14 and X represents an anion, such as, for instance, perchlorate, nitrate, sulfate, chloride, bromide, iodide, $ROSO_3^-$, $ROSO^-$, or $RSO_3^-$ where each R is alkyl or aryl, are highly effective under a wide variety of conditions. Unexpectedly, the high level of activity of compositions of the present invention against a large variety of pathogenic organisms coupled with good water solubility, low phytotoxicity, good stability to heat, light, chemical oxidants, fabric softeners and detergents cogently points up the markedly enhanced disinfectant and sanitizing properties of the aforementioned compositions.

In general, the active algicidal, fungicidal and antimicrobial compounds employed in the process of the invention are prepared in a straightforward manner by heating an alcoholic solution containing one mole of an appropriate $\alpha,\omega$-dihaloalkane with about two or more moles of triphenyl phosphine. Resultant product is then recovered as by filtration or by precipitation with ethyl ether.

In the preparation of the identified compositions, either a suitable alkane dialkyl sulfonate ester or an alkane diarylsulfonate ester can be substituted for the $\alpha,\omega$-dihaloalkane reactant to yield the corresponding alkyl sulfonate or aryl sulfonate salts, respectively, of the identified compositions. Other salts, such as acetates, nitrates, sulfates or perchlorates, can be prepared from the resultant dihalide, for example, by well-known exchange reactions.

Illustrative $\alpha,\omega$ - alkylenebis[triphenylphosphonium salts] contemplated by the invention are:

1,8-octamethylenebis[triphenylphosphonium chloride];
1,16 - hexadecamethylenebis[triphenylphosphonium bromide];
1,16-hexadecamethylenebis[triphenylphosphonium chloride];
1,12 - dodecamethylenebis[triphenylphosphonium bromide];
1,8-octamethylenebis[triphenylphosphonium ethyl sulfate];
1,12 - dodecamethylenebis[triphenylphosphonium propyl sulfate];
1,16 - hexadecamethylenebis[triphenylphosphonium acetate];
1,12 - dodecamethylenebis[triphenylphosphonium toluene sulfonate];
1,8-octamethylenebis[triphenylphosphonium nitrate];
1,10-decamethylenebis[triphenylphosphonium nitrate];
1,10 - decamethylenebis[triphenylphosphonium perchlorate];
1,8-octamethylenebis[triphenylposphonium perchlorate];
1,10 - decamethylenebis[triphenylphosphonium sulfate]; and
1,8-octamethylenebis[triphenylphosphonium sulfate].

Advantageously, a wide range of growth inhibiting amounts of salt herein contemplated may be admixed with an inert carrier applied to an area to be treated. Thus, in treating swimming pool water, a small, but effective, amount from 1 to 100 parts per million (p.p.m.) of the salt can be added to the water to be treated either as such or diluted with a major amount of water to inhibit algae growth. Minor amounts of salts may also be incorporated into major amounts of other diverse extenders, such as starch, natural gums, agar, commercially available synthetic detergents of the anionic or non-ionic types.

For use in the latter detergent extender, as much as 300 p.p.m., or more, can be tolerated to inhibit microbial growth.

The invention will be further illustrated in conjunction with the following examples which are to be taken as illustrative only and not by way of limitation. All parts are by weight unless otherwise noted.

A typical preparation of the illustrative biocidal compounds is presented below.

EXAMPLE 1

*Preparation of 1,10-decamethylenebis[triphenyl-phosphonium bromide]*

A mixture of 110 parts of triphenyl phosphine, 60 parts of 1,10-dibromodecane, and 100 parts (by volume) of n-butyl alcohol are refluxed in a suitable reaction vessel for 18 hours, then cooled to permit the addition of diethyl ether. From this mixture a tacky product precipitated, is separated from the ether and dissolved in a minimum amount of n-butyl alcohol and again reprecipitated from diethyl ether. The precipitate is dissolved in 250 cc. of boiling n-butyl alcohol, then cooled and treated with diethyl ether. The purified product had a melting point of 232° C. to 234° C.

EXAMPLE 2

Antifungal activity of the compounds of the instant invention is demonstrated in the following tests wherein accurately weighed amounts of 1,10-decamethylenebis [triphenyl-phosphonium bromide] are placed in test tubes and dissolved or suspended in predetermined quantities of sterile, hot fluid asparagine agar (meat extract, 2.0 grams; asparagine, 0.5 grams; dibasic potassium phosphate, 0.5 gram; agar, 20.0 grams; water, q.s. to 1000 milliliters with no pH adjustment) to provide known concentration test material in the agar.

The contents of each tube are thorougly mixed and poured into petri dishes to harden. Aqueous suspensions of the test cultures of fungi are then streaked upon the surface of the agar and permitted to incubate for 48 or 96 hours. After incubation, all plates are examined and the results recorded. Controls are prepared in the same manner as stated above with the exception that the agar employed is free of test compound. Cultures of each test organism are also streaked on the control agar surface and are found to proliferate profusely.

Results of the tests are recorded in Table I below wherein the lowest concentration, in parts per million, of test compound found to produce 100% control of the test organism is presented.

TABLE I

| Compound | P.p.m. | Organism |
|---|---|---|
| [⟨◯⟩]₃-P⁺—CH₂(CH₂)₈CH₂—P⁺-[⟨◯⟩]₃ · 2Br⁻ | 250 | Candida albicans. |
| | 62 | Saccharomyces cerevisiae. |
| | 62 | Mucor ramannianus. |
| | 8 | Hormodendrum cladosporoides. |
| | 31 | Trichophyton mentagrophytes. |
| | 4 | Microsporum gypseum. |
| | 8 | Penicillium digitatum. |
| | 2 | Memnoniella echinata. |
| | 4 | Chaetomium globosum. |
| | 250 | Aspergillus fumigatus. |

Substituting for the test compound in Table I, 1,8-octamethylenebis[triphenylphosphonium bromide], substantially the same results as reported in Table I are noted.

EXAMPLE 3

Activity of the compounds of the instant invention in controlling both gram-positive and gram-negative bacteria is illustrated by the following tests wherein graded levels of 1,10-decamethylenebis[triphenylphosphonium bromide] are dissolved or suspended in sterile hot trypticase-soy agar (1.5% casein peptone, 0.5% soyapeptone, 0.5% sodium chloride, 1.5% agar) and poured into petri dishes to harden. Suspensions of bacterial organisms are streaked on the agar surfaces and incubated for 48 hours, then examined for bacterial proliferation and the results recorded. These results are provided in Table II and are reported as the lowest concentration of test compound which produces 100% bacterial control.

Activity of the compounds of the invention against anaerobic bacteria is determined by a broth dilution method of assay. In this method, graded levels of 1,10-decamethylenebis[triphenylphosphonium bromide] in one milliliter of solution are added to 9 milliliters of thioglycollate medium. The solutions are inoculated with the organism *Clostridium sporogenes* and incubated for 48 hours at 37° C. At the end of the incubation period, the solutions are examined. Those found to be clear with no growth are read as active, those which are cloudy or have a characteristic odor are read as inactive. As in Example 1, results are reported as the lowest concentration of compound found to produce 100% control of the test organism in Table II below.

TABLE II

| Compound | P.p.m. | Organism | |
|---|---|---|---|
| [⟨◯⟩]₃-P⁺—CH₂(C H₂)₈CH₂—P⁺-[⟨◯⟩]₃ · 2 Br⁻ | 4 | Mycobacterium smegmatis | Gram-Positive. |
| | 4 | Staphylococcus aureus | |
| | 31 | Streptococcus faecalis | |
| | 8 | Bacillus subtilis | |
| | 125 | Proteus vulgaris | Gram-Negative. |
| | 250 | Escherichia coli | |
| | 250 | Salmonella gallinarum | |
| | 15 | Clostridium sporogenes | Anaerobic. |

EXAMPLE 4

Laundry washing tests are carried out in screw-capped, 8-ounce wide-mouth jars with agitation provided by a reciprocating machine operating at 180 cycles per minute. To each jar is added 20 milliliters of hot (60° C.), 0.25% w./v. aqueous non-germicidal, anionic synthetic detergent, that is a built, alkyl aryl sodium sulfonate all purpose, granular detergent solution, and 3 or 4 glass beads. The jars and contents are then sterilized for 15 minutes at 121° C., cooled, placed in a water bath at 60° C. and 1 milliliter of an acetone solution containing 0.1 milligram 1,10-decamethylenebis[triphenylphosphonium bromide] is added. (The germicide concentration is thus 5 p.p.m. with respect to the wash water, or expressed in terms of the weight of detergent, the concentration is 0.2%.). Twenty 1-inch diameter circular discs of unbleached cotton fabric, weighing about 1.0 gram, are added, the jars briefly swirled to distribute the circles, and transferred to the reciprocating shaker. Jars are shaken for 10 minutes at the end of which time the wash water is next decanted and replaced with 100 milliliters sterile water at room temperature. The simulated rinse cycle lasts one minute. The rinse water is decanted and the circles transferred to sterile wire screens and dried for 30 minutes at 50° C. to 55° C.

Cotton fabrics so laundered are imparted with an antibacterial finish as evidenced by their failure to support growth when inoculated with a suspension of a viable culture of *Staphylococcus aureus* or *Brevibacterium ammoniagenes* implanted on the surface of a solidified nutrient agar and incubated 48 hours at 37° C.

Similar results are obtained utilizing 1,12-dodecamethylenebis[triphenylphosphonium chloride] in lieu of 1,10-decamethylenebis[triphenylphosphonium bromide].

Control fabrics similarly laundered but in the absence of a germicide supported luxuriant growth of *Staphylococcus aureus* and *Brevibacterium ammoniagenes*.

EXAMPLE 5

Cotton cloth circles are laundered as described in Example 4 above. The cloth to liquor ratio is maintained at 1:20, respectively, and germicide concentration at 5 p.p.m. with respect to wash water. However, 0.1 milliliter of bleach solution, diluted 20 percent with water, is added after the germicide addition, but prior to adding the cotton circles. The laundry bath now contains about 200 p.p.m. of available chlorine. Cotton circles are then added, subjected to the wash, rinse, and drying steps as previously described, and inoculated with a suspension of viable *Staphylococcus aureus*. Cotton fabric so treated and incubated 2 days at 37° C. on nutrient agar failed to support bacterial growth. In contradistinction, luxurious growth of *Staphylococcus aureus* is obtained when control swatches washed in the detergent alone or in detergent containing 5 p.p.m. of 3,4,4'-trichlorocarbanilide are similarly incubated on nutrient agar.

EXAMPLE 6

Cotton swatches are washed as described in Example 5 in the germicide-detergent system with about 200 p.p.m. available chlorine present. Samples are dried at 50° C. to 55° C. for 30 minutes and then autoclaved for 15 minutes at 121° C. Cotton swatches so treated effectively suppressed the growth of *Staphylococcus aureus*, whereas control fabric washed in the absence of germicide supported growth of *Staphylococcus aureus* at a density of 3000 to 4000 colonies per square inch.

EXAMPLE 7

Cotton circles washed and dried as described in Example 5 are subjected to ultra-violet irradiation for 2 hours at a distance of one meter from the lamp. (This exposure is equivalent to 8 hours of sunlight.) Samples so treated failed to support growth of *Staphylococcus aureus*, whereas control fabrics laundered in non-germicidal detergent and similarly exposed to ultra-violet irradiation supported luxurious growth.

EXAMPLE 8

Cotton swatches are laundered as described in Example 5 except that the final germicide concentration is now 1.67 p.p.m. with respect to the wash water (0.067% on the detergent weight) instead of 5 p.p.m. The rinsed and dried samples are inoculated with a suspension of a viable culture of *Brevibacterium ammoniagenes*, implanted on nutrient agar, and incubated for 2 days at 30° C. No bacterial growth is evident on samples so treated, whereas control swatches laundered in non-germicidal detergent with 200 p.p.m. available chlorine supported the growth of more than 2000 colonies per square inch.

EXAMPLE 9

Antibacterial activity

One milliliter test solution of 1,10-decamethylene-bis [triphenylphosphonium bromide] is added to 49 ml. amounts of melted trypticase soy agar (49° C.), mixed, and poured into plastic petri dishes to solidify. The series of agar plates thus prepared contains 125, 25, 5, 1 and 0.2 mcg./ml. of 1,10-decamethylenebis[triphenylphosphonium bromide], respectively.

Nutrient broth cultures (incubated 48 hours at 37° C.) of five test micro-organisms are streaked on each of the agar plates. After 24 hours incubation at 37° C., the minimum concentration of 1,10-decamethylenebis[triphenylphosphonium bromide] that inhibited growth of each micro-organism is recorded in Table III below:

TABLE III

| Test Micro-organism | Minimum Inhibitory Concentration (in mcg./ml.) of 1,10-decamethylenebis[triphenylphosphonium bromide] |
|---|---|
| *Bordetella bronchiseptica* | 25 |
| *Escherichia coli* | 25 |
| *Salmonella gallinarum* | 125 |
| *Salmonella typhosa* | 5 |
| *Staphylococcus aureus* | 1 |

EXAMPLE 10

Antifungal activity against plant pathogens

The activity of the compounds of the instant invention against the organisms *Monilinia fructicola*, the pathogen that incites American brown rot of stone fruit, *Stemphylium sarcinaeforae*, the pathogen responsible for leafspot of several legumes and *Aspergillus niger*, a saprophyte which degrades textiles, fabrics, leather and stored fruits and vegetables, is demonstrated by the following test wherein sufficient amounts of 1,10-decamethylenebis[triphenyl-phosphonium bromide] are dissolved or suspended in water to provide dilutions of 100 p.p.m., 10 p.p.m. and 1 p.p.m. of test compound in solution when 0.4 ml. of solution is added to 3.6 ml. of a spore suspension of the test organism.

Separate spore suspensions of the above-identified pathogens are prepared from 7 to 10-day cultures of the organisms grown on potato-dextrose agar slants. The spores are washed from the agar slants with distilled water and are adjusted to a concentration of approximately 50,000 spores per cc. of water. Two ml. of orange juice is added per liter of spore suspension to facilitate germination. To "opticlear" vials, 0.4 ml. of solution of test compound is added along with 3.6 ml. of spore suspension. The vials are then placed on a tumbler and the tumbler rotated to assure contact of chemical and organism. At the end of a 24-hour exposure period, the suspensions are examined microscopically to determine if germination has occurred. The results of the above test are recorded in Table IV below.

TABLE IV

| | Percent kill |
|---|---|
| *Monilina fructicola:* | |
| 100 p.p.m. | 100 |
| 10 p.p.m. | 95 |
| 1 p.p.m. | 0 |
| *Stemphylium sarcinaeforae:* | |
| 100 p.p.m. | 100 |
| 10 p.p.m. | 100 |
| 1 p.p.m. | 95 |
| *Aspergillus niger:* | |
| 100 p.p.m. | 100 |
| 10 p.p.m. | 100 |
| 1 p.p.m. | 0 |

EXAMPLE 11

Alga inhibition

Activity of 1,10 - decamethylenebis[triphenylphosphonium bromide] is tested against three algae species using a broth culture technique. Graded levels of the test toxicant are dispensed in Erlenmeyer flasks containtaining 50 ml. of Chu's mineral salts as disclosed in Journal of Ecology, vol. 30, pp. 284–325 (1942). An inoculum of the test algae culture is placed in each flask and the test sample incubated at room temperature for three days. At the end of the test period, the results are recorded in Table V below as to amounts of toxicant required to completely control algae. Absent toxicant, no control is noted.

TABLE V

| Algae: | Amount of toxicant in p.p.m. |
|---|---|
| "Black" algae (a chlorine resistant bluegreen) | 1.5 |
| Ankistrodesmus species (green) | <0.8 |
| Clamydomonas species (green) | <0.8 |

Similar results are obtained employing 1,16-hexadecamethylenebis[triphenylphosphonium chloride] in lieu of the toxicant used in this example.

EXAMPLE 12

Cotton fabrics are laundered following the procedure of Example 4, except that they are subjected to a total of three rinses and dried. It is noted that the so-laundered fabrics fail to support growth of *S. aureus*, whereas the control fabrics similarly laundered without any germicidal additive support luxurious growth. A durable antibacterial finish is thus imparted to the laundered fabrics by the exemplified biocidal compounds. So-treated fabrics are particularly well suited for use under conditions requiring a substantial degree of bacterial control.

It is believed that the durability of the fabrics' finish is due to the substantivity of the compositions defined above.

EXAMPLE 13

This example demonstrates the effect of 1,10-decamethylenebis[triphenylphosphonium bromide] in controlling the organism, *Pityrosporum ovale*, which is readily isolated from the human scalp.

Activity against *Pityrosporum ovale* is determined by an agar dilution method in which graded levels of 1,10-decamethylenebis[triphenylphosphonium bromide] are dissolved in molten Emmons agar (1% neopeptone, 4% dextrose and 2% agar) and poured into Petri dishes to harden. A suspension of *P. ovale* in sterile corn oil is streaked over the surface of the hardened plates and incubated for 72 hours at 30° C. At the end of this time, plates are examined. It is noted that as little as 100 parts per million of the compound suppress the growth of the aforementioned organism.

We claim:

1. A method of treating industrial processing water to control the growth of microbial, algae or fungi organisms therein comprising: adding to said processing water a growth inhibiting amount of a compound of the formula:

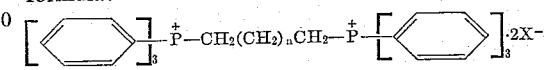

wherein X represents an anion and where $n$ is an integer of from 6 to 14.

2. The method according to claim 1 wherein the compound is: 1,10-decamethylenebis[triphenylphosphonium bromide].

3. The method according to claim 1 wherein the compound is: 1,16 - hexadecamethylenebis[triphenylphosphonium chloride].

References Cited

FOREIGN PATENTS 1,183,338  12/1964  Germany.

OTHER REFERENCES

Chem. Abstracts 61: 14267c (1964).

MICHAEL E. ROGERS, *Primary Examiner.*